(12) United States Patent
Hann et al.

(10) Patent No.: US 6,479,433 B1
(45) Date of Patent: Nov. 12, 2002

(54) POLYURETHANE FOAM COMPOSITES FOR GROWER APPLICATIONS AND RELATED METHODS

(75) Inventors: Daniel G. Hann, Akron, OH (US); Vahid Sendijarevic, Troy, MI (US); Kurt C. Frisch, deceased, late of Grosse Ile, MI (US), by Sally Frisch, co-executor

(73) Assignee: Smithers-Oasis Company, Cuyahoga Falls, OH (US)

( * ) Notice: Subject to any disclaimer, the term of this patent is extended or adjusted under 35 U.S.C. 154(b) by 0 days.

(21) Appl. No.: 09/678,870

(22) Filed: Oct. 2, 2000

(51) Int. Cl.[7] ................................................. A01N 37/34
(52) U.S. Cl. ...................................... 504/141; 504/309
(58) Field of Search ............................... 504/116.1, 141, 504/309

(56) References Cited

U.S. PATENT DOCUMENTS

| | | | |
|---|---|---|---|
| 3,472,644 A | 10/1969 | Woodside | 71/1 |
| 3,706,678 A | 12/1972 | Dietrich | 260/2.5 |
| 3,899,850 A | 8/1975 | Gluck et al. | 47/37 |
| 3,973,355 A | 8/1976 | McKenzie | 47/37 |
| 4,034,507 A | 7/1977 | Dedolph | 47/66 |
| 4,034,508 A | 7/1977 | Dedolph | 47/84 |
| 4,238,374 A | 12/1980 | Durham et al. | 260/17.4 |
| 4,241,537 A | 12/1980 | Wood | 47/77 |
| 4,329,436 A | 5/1982 | Dedolph | 521/99 |
| 4,377,645 A | 3/1983 | Gurhrie | 521/137 |
| 4,384,051 A | 5/1983 | Guthrie | 521/137 |
| 4,422,990 A | 12/1983 | Armstrong et al. | 264/45.3 |
| RE32,476 E | 8/1987 | Kistner | 405/264 |
| 5,095,042 A | 3/1992 | Glorioso et al. | 521/125 |
| 5,290,818 A | 3/1994 | Nafziger et al. | 521/54 |
| 5,322,309 A | 6/1994 | Ramazzotti et al. | 366/88 |
| 5,424,338 A | 6/1995 | Krueger | 521/174 |
| 5,650,450 A | 7/1997 | Lovette et al. | 521/112 |
| 5,817,860 A | 10/1998 | Rizk et al. | 560/25 |
| 5,968,993 A | 10/1999 | Bleys | 521/50 |

FOREIGN PATENT DOCUMENTS

| JP | 52145498 | * 12/1977 | |
|---|---|---|---|

* cited by examiner

Primary Examiner—Alton Pryor
(74) Attorney, Agent, or Firm—Renner, Kenner, Greive, Bobak, Taylor & Weber

(57) ABSTRACT

A horticultural growing medium comprises a polyisocyanate-polyol-based polymer, and at least one filler material. A method of making a horticultural growing medium comprises the steps of mixing at least one filler material with a polyisocyanate-polyol-based quasi-prepolymer composition, to form a quasi-prepolymer/filler mixture and applying water to the quasi-prepolymer/filler mixture to form a hydrophilic growing medium. A method of growing plant seedlings comprising planting a seed or seedling in a horticultural growing medium containing a hydrophilic polyisocyanate-polyol-based polymer and at least one filler material, is also disclosed. A hydrophilic urethane polymer comprises the reaction product of a quasi-prepolymer and water wherein the quasi-prepolymer contains an isocyanate and a hydrophilic polyol. A method of making a hydrophilic polyurethane comprises the steps of adding a hydrophilic polyol to an isocyanate, mixing the polyol and isocyanate to form a quasi-prepolymer, and contacting the quasi-prepolymer with water.

24 Claims, 4 Drawing Sheets

POLYURETHANE FOAM COMPOSITES FOR GROWER APPLICATIONS AND RELATED METHODS

TECHNICAL FIELD

This invention relates to the synthesis and use of urethane foams in grower applications. More particularly, this invention relates to a hydrophilic urethane and a composite urethane foam composition which may incorporate materials such as peat, ground scrap foam, or other filler materials.

BACKGROUND OF THE INVENTION

In the area of horticulture, it is known to use individual containers for the promotion of seed germination and seedling growth. Seeds may be germinated in small individual containers or subdivided trays containing earth, peat, vermiculite, or other potting material, and grown under controlled greenhouse conditions for quick initial growth. Seedlings are typically transplanted to larger containers or to the field on reaching a sufficient stage of maturity. The filling of such seedling containers with potting material can be a time consuming process, making use of such containers relatively expensive and less desirable than direct planting in the field in some cases. The use of such materials, while providing for robust initial plant growth for seedlings, presents other disadvantages when the seedling is transplanted, either to a larger container or to the field. When a seedling is transplanted, damage to the root system may occur, for example, if the loose potting material falls away from the roots and pulls some of the roots away from the seedling. Root damage occurring during transplantation is a particular problem when seedlings are mechanically transplanted.

The use of a cohesive potting material in such applications has been attempted to alleviate such disadvantages. One previous method used a polyurethane foam as a substrate for plant growth. While the use of polyurethane decreased the likelihood of damage to the root system of seedlings grown in such a medium, polyurethane alone cannot deliver necessary nutrients to the seedling. While some nutrients can be incorporated into a polyurethane foam, others may impair the structural properties of the foam.

Another previous invention overcame some of the disadvantages of both the use of non-cohesive growing material and polyurethane foam plant growth medium by combining foam flakes and nutritives with a binding agent such as polyurethane. This invention provided good hydration to the growing plants due to the water capacity of the foam flakes. The structure of this material also provided for good aeration of the root system of seedlings planted in the material. According to this previous invention, the medium is introduced into a container and subjected to pressure to induce reaction of the polyurethane. This reaction may be accelerated by exposing the composition to steam. Such treatment suffers from the disadvantage that steam treatment sterilizes the medium of microbes, at least some of which may be beneficial for plant growth. If the presence of such microbes is desired, they must be separately added to the medium after the binder has set.

Another known method of making a composite plant growth medium also utilized a pre-polymer such as polyurethane to form a soil composite material. According to this method, a slurry of soil material and water is brought into contact with a water-reactive pre-polymer, initiating a reaction between the pre-polymer and the water. During this initial reaction time, the mixture swells. The mixture is quickly dispensed into receptacles during this initial reaction time. Once deposited in the receptacles, the composite may also be compressed in order for the finished material to assume a predetermined shape or configuration.

A related method includes the mixing of a urethane prepolymer with aggregate material and optionally, fertilizers, herbicides, or related supplements, followed by mixing with sufficient water to form a pourable slurry. The formation of a slurry was previously necessary to insure adequate mixing of the prepolymer and aggregate with water. The pourable slurry is then deposited in a mold to form a shaped aggregate. According to this invention, polyisocyanates are used as the prepolymer, with tolylene diisocyanate being especially preferred. Both this method and the previous method depend on the formation of a pourable slurry of prepolymer, aggregate material, and optionally, surfactant. This dependence on formation of a slurry, however, creates disadvantages in this and similar methods. Namely, foam composites formed from a slurry have a water content which can allow the growth of molds or other microbes which may be harmful to the growing plant or to the structural soundness of the composite, or may simply be esthetically unpleasant to consumers.

Also, foam composites having a significant water content will naturally be heavier than similar products without a high water content, creating greater cost and difficulty in manufacturing and shipping. Furthermore, the use of tolylene diisocyanate can be problematic for individuals who are sensitive to this compound. Previous polyurethane foam compositions also suffered from the disadvantage that these polyurethanes were not hydrophilic, necessitating the addition of wetting agents to permit adequate water penetration into the foam composite.

Therefore, there is a need for a hydrophilic polyurethane composition. There is also a need for a composite foam composition for plant growing applications which may incorporate filler materials such as peat, ground scrap foam, or other filler materials, and is not formed from a prepolymer slurry containing water and filler material.

There is also a need for a method of making a composite foam composition for plant growing applications which may include filler materials such as peat, ground scrap foam, or other filler materials, and which does not include the formation of a prepolymer slurry containing water and filler material.

There is likewise a need for a method of growing a plant in a composite foam composition which is not formed from a prepolymer slurry containing water and filler material.

BRIEF SUMMARY OF THE INVENTION

It is, therefore, an aspect of the present invention to provide a hydrophilic polyurethane foam.

It is another aspect of the present invention to provide a composite foam composition for plant growing applications which may incorporate filler materials such as peat, ground scrap foam, or other materials, and is not formed from a prepolymer slurry containing water and aggregate material.

It is yet another aspect of the present invention to provide a method of making a composite foam composition for plant growing applications which may include filler materials such as peat, ground scrap foam, or other filler materials, and which does not include the formation of a prepolymer slurry containing water and filler material.

It is still another aspect of the present invention to provide a method of growing a plant in a composite foam composition which is not formed from a prepolymer slurry containing water and filler material.

In general, the present invention provides a horticultural growing medium comprising a polyisocyanate-polyol-based polymer, and at least one filler material. The filler material may be any of a variety of additives, such as, for example, earth, sand, peat moss, limestone, gypsum, coir (coconut fiber), and ground floral foam and mixtures thereof. It is also envisioned that other types of foam may be used as filler. Other substances may also be used as filler material, provided that they do not harm growing plants.

The present invention also provides a method, of making a horticultural growing medium comprising the steps of mixing at least one filler material with a polyisocyanate-polyol-based quasi-prepolymer, to form a quasi-prepolymer/filler mixture and applying water to the quasi-prepolymer/filler mixture to form a hydrophilic growing medium. The growing medium may be placed in containers such as trays or other molds and then allowed to solidify into a coherent aggregate. Alternatively, the quasi-prepolymer/filler mixture may be placed into a container prior to being contacted with water. Water may be sprayed onto the quasi-prepolymer/filler mixture in the mold or, the quasi-prepolymer/filler mixture and mold may be immersed in water to cause the quasi-prepolymer to react and foam in the container.

The present invention also provides a method of growing plant seedlings comprising planting a seed or seedling in a horticultural growing medium containing a hydrophilic polyisocyanate-polyol-based polymer and at least one filler material.

The present invention also provides a hydrophilic urethane polymer comprising the reaction product of a quasi-prepolymer and water wherein the quasi-prepolymer contains an isocyanate and a hydrophilic polyol.

Finally, a method of making a hydrophilic polyurethane comprises the steps of adding a hydrophilic polyol to an isocyanate; mixing the polyol and isocyanate to form a quasi-prepolymer, and contacting the quasi-prepolymer with water is provided.

The horticultural growing medium of the present invention displays flexibility, strength, and wetting characteristics which make it an ideal medium for plant growth. Furthermore, the growing medium is formed by a novel method which does not depend on the formation of a slurry, simplifying the pouring of the quasi-prepolymer/filler mixture into molds to form growing medium plugs. The decreased use of water in forming the growing medium plugs decreases the weight of the finished growing medium plugs, thereby decreasing the cost of transporting the finished product to consumers. The decreased water content also improves the ease with which the product can be handled while decreasing the likelihood of the growing medium plugs being subject to rot or other spoilation.

At least one or more of the foregoing aspects, together with the advantages thereof over the known art relating to polyurethane-based growing medium, which shall become apparent from the specification which follows, are accomplished by the invention as hereinafter described and claimed.

DETAILED DESCRIPTION OF THE INVENTION

Figure 1:
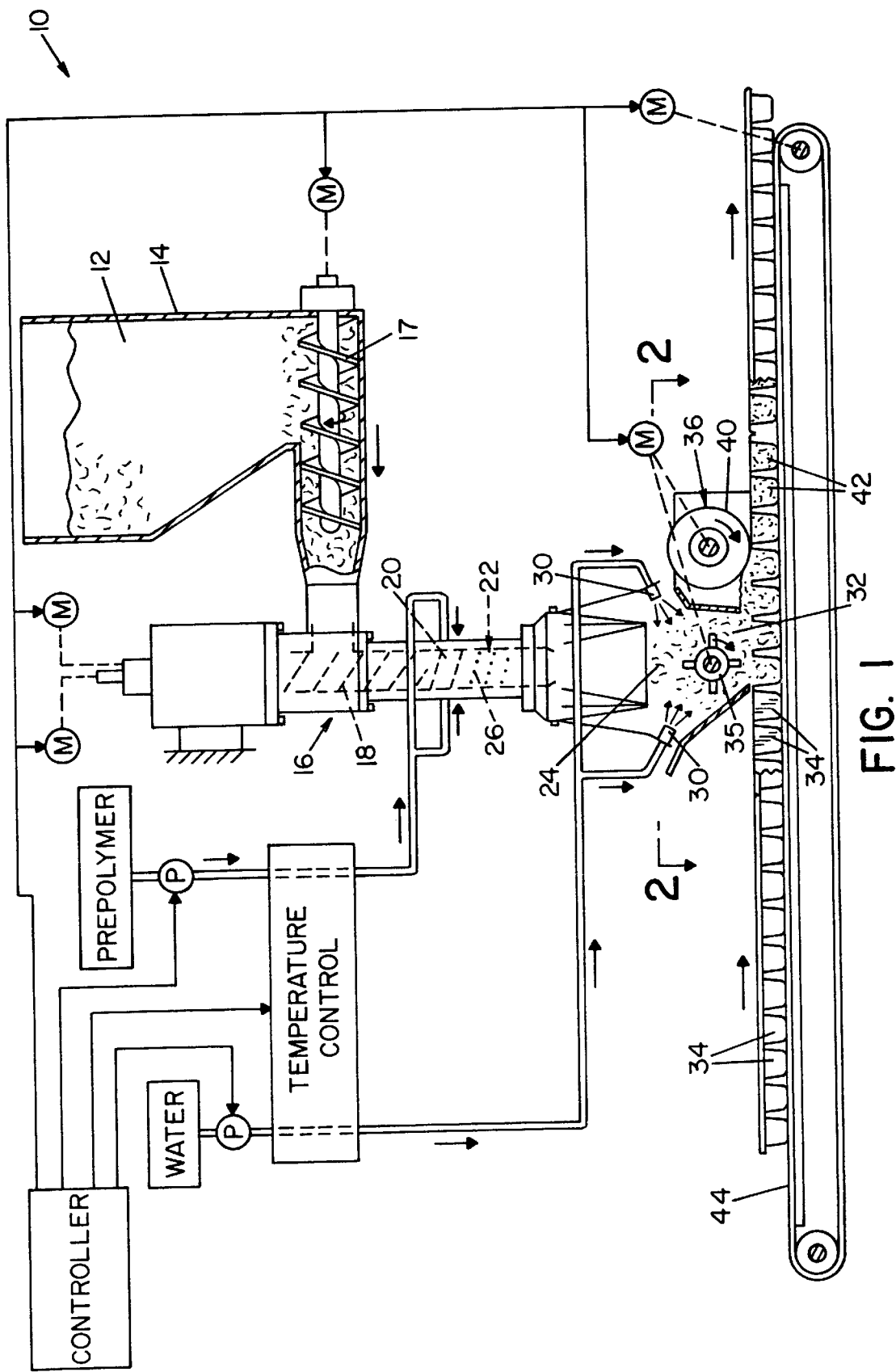
FIG. 1 is a diagrammatic view of a mixing apparatus for making the horticultural growing medium of the present invention.

As previously mentioned, the present invention is directed toward a growing medium for horticultural purposes. The growing medium comprises a polyisocyanate-polyol-based hydrophilic polymer, and at least one filler material. It is envisioned that any horticulturally acceptable filler may be used in the present invention. Non-exclusive examples of such a filler include peat moss, earth, sand, coir (coconut fiber), limestone, gypsum, and ground floral or other foam. Other cellulosic material such as sawdust and compost may also be used. It is also envisioned that organic material such as manure may be used as a filler. Mixtures of these fillers may also be used.

The growing medium contains a polyisocyanate-polyol-based polymer which is a reaction product of a quasi-prepolymer and water. The quasi-prepolymer is based on a polyisocyanate and a polyol. Suitable polyisocyanates may have any of a number of NCO groups. In one embodiment, the quasi-prepolymer is based on polymethylene polyphenylene polyisocyanate with an average NCO functionality of about 2 to about 3, and a polyol. In another embodiment, the polyisocyanate is diphenylmethane diisocyanate.

Various polyols of different molecular weights may be used to form the hydrophilic polymer used in the present invention, including mixtures of diols and monoalcohols. The only requirement is that the polyol component contribute sufficient hydrophilic character to the polymer that the polymer itself is hydrophilic. As used herein, the term hydrophilic, when used in connection with a solid, means capable of being readily wet by water. A hydrophilic polymer will be capable of absorbing and/or adsorbing at least 100 percent of its own weight in water. When used in connection with a liquid, the term hydrophilic means the liquid is miscible in water or aqueous solutions. In one embodiment, the polyol is selected from polyether glycols, such as, for example, random copolymers and block copolymers of propylene oxide and ethylene oxide. It is also envisioned that mixtures of polyethylene glycols with random or block copolymers based on polyalkylene oxides having from about 2 to about 6 carbon atoms may be used.

The polymer used in the present invention is formed from a quasi-prepolymer based on a polyisocyanate and a polyol. In the quasi-prepolymer, there is an excess of NCO equivalents relative to OH equivalents. The properties of the quasi-prepolymer, and therefore, the properties of the growing medium made from the quasi-prepolymer, will vary according to many factors, including the NCO:OH ratio. Generally, as this ratio increases, the growing medium becomes less elastic and more brittle. At the same time, as the NCO:OH ratio decreases, the viscosity of the quasi-prepolymer increases, making mixing of the quasi-prepolymer with the filler more difficult. Therefore, when selecting the composition of a quasi-prepolymer, the ease and adequacy of mixing with the filler must be balanced against the elasticity of the growing medium. In one embodiment, the NCO:OH ratio of the quasi-prepolymer is between about 3:1 and about 6:1. In another embodiment, the NCO:OH ratio is about 4:1.

Another factor which may affect the properties of the growing medium is the ratio of quasi-prepolymer to filler present in the growing medium. In general, as the amount of quasi-prepolymer increases relative to the amount of filler, the growing medium will be more elastic. Conversely, as the amount of quasi-prepolymer decreases relative to the amount of filler, the growing medium will be more rigid. The ratio of quasi-prepolymer to filler may vary according to the mechanical requirements of a particular application, the nature and type of filler used, and the nature and type of quasi-prepolymer used. While a growing medium may be made without any filler, in one embodiment, the filler and quasi-prepolymer are present in at least 1:1 weight ratio. In another embodiment, the quasi-prepolymer and filler are present at relative percentages of about 15 to 50 percent quasi-prepolymer and about 50 to 85 percent filler.

Optionally, other materials may also be included in the growing medium of the present invention. These optional ingredients include, for example, wetting agents, blowing agents, trace elements, fertilizers, fungicides, herbicides, insecticides, and pigments, provided that the optional ingredient or ingredients added do not interfere with the seedling to be grown in growing medium. Wetting agents which are particularly useful include nonionic surfactants such as SOAX from Smithers-Oasis, ammonium laurel ether sulfate surfactants such as STEOL from Smithers-Oasis, and silicone surfactants such as L-5340 from Union Carbide. Wetting agents enhance uniform rewetting of the growing medium, especially after the growing medium has dried out during storage. Amounts of the optional ingredients, when present, comprise from about 0.07 to about 1.64 percent by weight of the total filler material.

As mentioned above, the present invention also provides a method of making a horticultural growing medium. The first step of this method is the addition of a polyol to an isocyanate to form a polyisocyanate-polyol-based quasi-prepolymer. A nitrogen envelope surrounding the polyol and isocyanate may be used during synthesis of the quasi-prepolymer to prevent the entry of water from the atmosphere into the isocyanate and polyol mixture. The use of a nitrogen envelope thereby prevents reaction of the quasi-prepolymer with water absorbed from the atmosphere. While not strictly necessary in the method of the present invention, the use of a nitrogen envelope is nevertheless desirable. The quasi-prepolymer may then be stored at room temperature until needed.

The polyisocyanate-polyol-based quasi-prepolymer is then mixed with at least one filler material. The mixing takes place without the addition of water, to form a quasi-prepolymer/filler mixture. Water may be present in the filler material, however. The quasi-prepolymer/filler mixture is then exposed to water to cause the quasi-prepolymer to react and foam. In one embodiment, the quasi-prepolymer/filler mixture is placed into a mold after being contacted with water but before the growing medium solidifies, thereby forming a growing medium which takes the shape of the mold. In another embodiment, the quasi-prepolymer mixture is placed in a mold prior to being contacted with water. Water may be introduced by spraying or pouring onto the mixture in the mold or the entire mold may be immersed in water to cause the quasi-prepolymer to react. Water may also be introduced in the form of water vapor.

Figure 2:
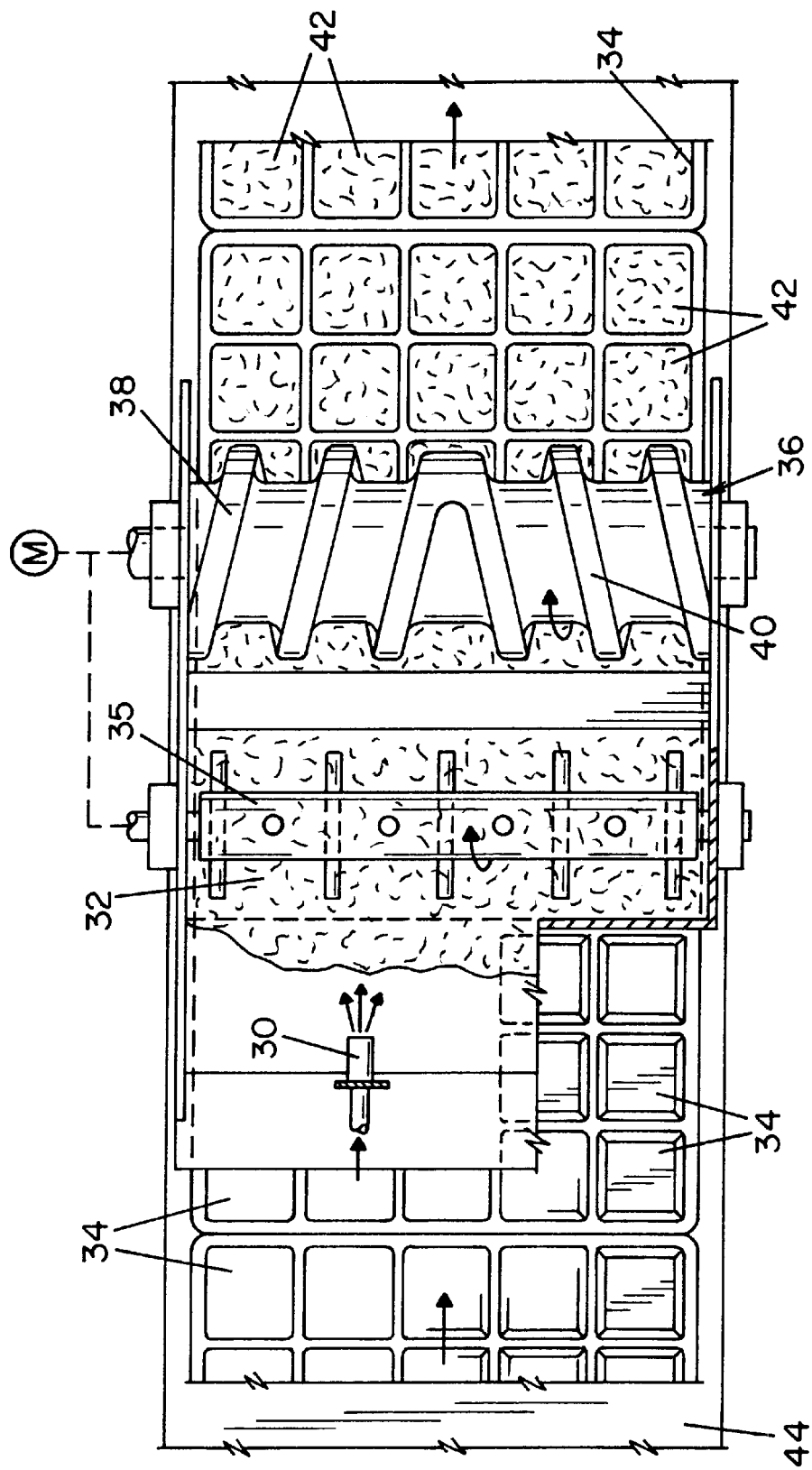
FIG. 2 is an elevational view of the embodiment shown in FIG. 1 taken substantially along line 2—2.
Figure 3:
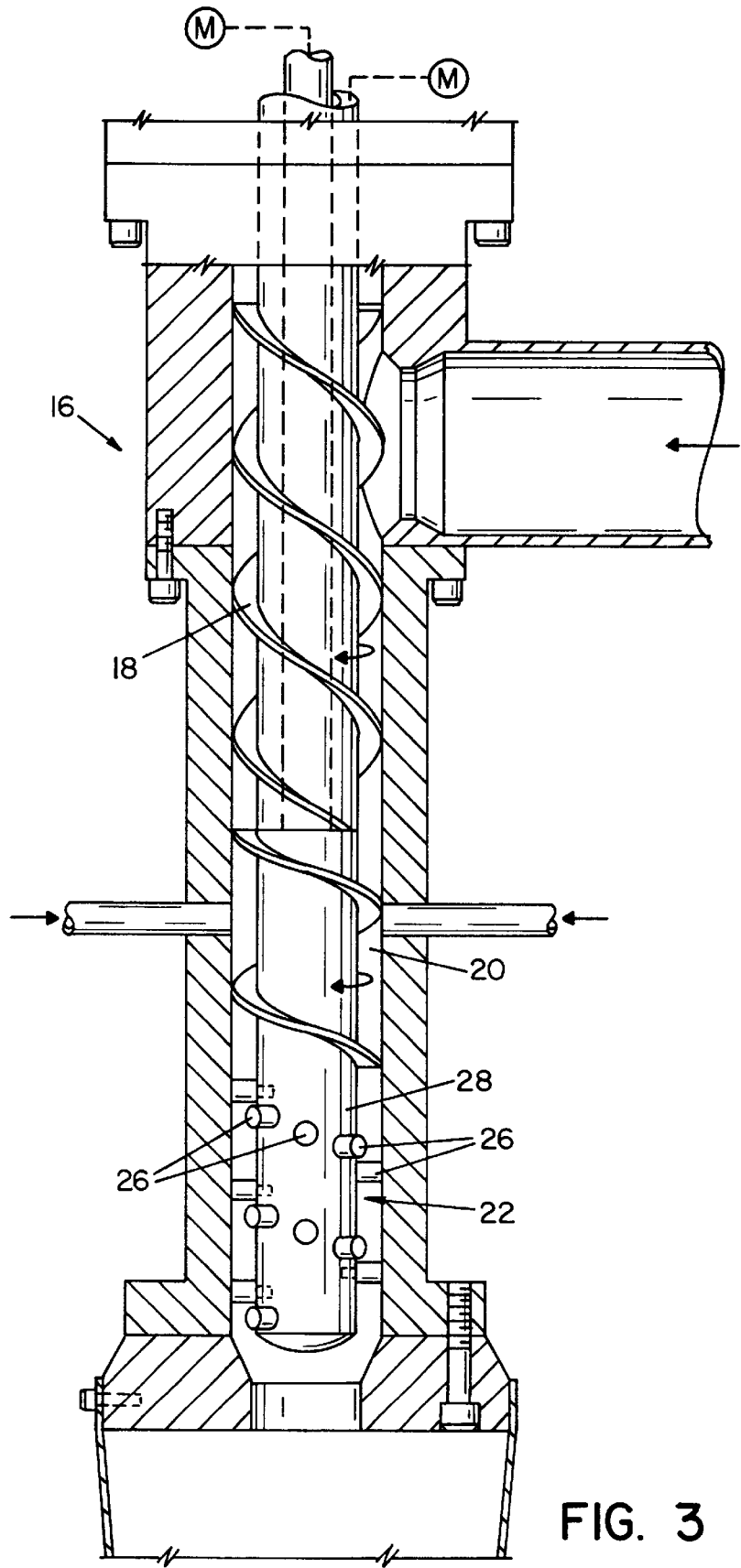
FIG. 3 is an enlarged partial sectional view of the upper and lower impeller of the apparatus shown in FIG. 1.

According to the method of the present invention, the quasi-prepolymer and filler are mixed so that the quasi-prepolymer coats the particles of filler. In one embodiment, the quasi-prepolymer and filler are mixed by hand. In another embodiment, the quasi-prepolymer and filler are mixed using a mechanical mixer as illustrated in FIGS. 1–3, and further described hereinbelow.

Once the quasi-prepolymer and filler have been adequately mixed to form a quasi-prepolymer/filler mixture, the mixture is contacted with water at a controlled temperature to cause the quasi-prepolymer to react and thereby cause it to foam and set up. The quasi-prepolymer/filler mixture may be contacted with water before or after the mixture is placed in a mold. The amount of water may vary with the properties of the finished growing medium sought and with the stage at which water is brought into contact with the mixture. In general the mole equivalents of water added should be at least equal to the mole equivalents of NCO present in the quasi-prepolymer. However, the water should be added in such an amount or at such a stage so that a slurry is not formed. In one embodiment the amount of water added is between about 1 and about 330 parts by weight of water per 100 parts by weight of quasi-prepolymer, prior to being placed in a mold. In another embodiment, water is added at a rate of about 200 and about 300 grams of water per 100 grams of quasi-prepolymer.

These amounts, while insufficient to form a slurry of aggregate material, are sufficient to cause the quasi-prepolymer to react, enabling the growing medium to be molded into a predetermined shape. In another embodiment, the quasi-prepolymer/filler mixture is placed in a mold prior to being contacted with water. In such an embodiment, water can be used in great excess of that used in the prior described embodiment without forming a slurry, In this embodiment, water can be sprayed or poured onto the quasi-prepolymer/filler mixture or the quasi-prepolymer/filler mixture may even be immersed in water to cause the quasi-prepolymer to react and foam.

In one embodiment the quasi-prepolymer is deposited into a mold after being contacted with water but prior to the time set up is complete. In another embodiment, the quasi-prepolymer is deposited into a mold and is contacted with water later, causing the quasi-prepolymer to react and to foam within the mold. In another embodiment, the quasi-prepolymer/filler mixture is sprayed with pre-heated water and immediately deposited into a mold to create a growing medium that assumes a predetermined shape. In another embodiment, the aggregate is molded in flats containing a series of growing medium blocks. Once deposited into a mold, the shape of the growing medium may be further manipulated. For example, a cavity may be introduced into the growing medium material to enhance ease of seed or seedling planting in the growing medium block. A cavity may also be introduced on the underside of the growing medium block to enhance drainage of excess water from the growing medium block, thereby preventing damage to a seedling caused by overwatering. In still another embodiment, the quasi-prepolymer/filler mixture is contacted with water and forms a block of growing medium which is then divided into smaller pieces or a desired shape and/or size.

This method of the current invention is highly amenable to automation, making the method highly economical. In such an embodiment, dry filler material may be processed to break it apart and to hydrate it. Hydrating dry filler material, such as, for example, coir, promotes the stability of the growing medium in size and shape during use. Dry filler material, such as coir, is placed in a Berg Sandmark mixer, which is a rotating drum with internal baffles used to break up the coir and allow it to expand with water. A predetermined amount of water is added to the bales of coir and the coir is tumbled until the bales are broken and the water is absorbed by the coir causing it to expand. The amount of water used will depend on the type and dryness of the filler used as well as the quasi-prepolymer used. For example, coir may be hydrated to 40 percent water by total weight. Peat moss, however, is typically 30 weight percent water and may be used without further hydration. If a filler material is incorporated into an growing medium without sufficient hydration, the growing medium will swell when a plant is watered.

This swelling makes subsequent removal of the growing medium from the mold or other holder for transplanting difficult or even impossible without risking damage to the growing medium and the plant. On the other hand, if the filler is overly saturated with water, the growing medium may shrink during use. If sufficient shrinkage occurs, the growing medium may become loose in the mold or other holder, increasing the likelihood of damage to the plant.

The hydrated coir is then transported to a grinder, for example, by a bale breaker-incline conveyor. The bale breaker may also be used to break bales of peat moss and convey them to the grinder. Once placed in the grinder, filler materials such as coir and peat are processed so they may be blended together to form a blended filler material.

A mechanical mixer 10, is illustrated in FIGS. 1–3. Ground filler 12 is transported from a grinder to at least one collection area 14 within mixer 10. If different types of filler material are to be used they may then be blended to create a substantially homogeneous mixture of filler materials. Filler 12 is then transported to a mix head system 16 by a motor driven feeder 17. Filler 12 is fed through the mix head system 16 by a motor driven auger-type upper impeller 18 which feeds filler 12 into a mixing region 20. The quasi-prepolymer is pumped at a controlled temperature into mix head system 16 and injected into mixing region 20. Quasi-prepolymer and filler 12 are mixed by a motor driven lower impeller 22 with a unique mixing head to form a quasi-prepolymer/filler mixture 24. As shown in FIG. 3, lower impeller 22 is configured with a series of cylindrical projections 26 protruding from the shaft 28 of lower impeller 22 in a helical pattern.

After quasi-prepolymer/filler mixture 24 is formed, it is ejected from the mix head system 16 and simultaneously sprayed with water at a controlled temperature by nozzles 30 as quasi-prepolymer/filler mixture 24 exits mix head system 16. Optionally, a wetting agent may be added with the water by nozzles 30. Exposure to water causes the quasi-prepolymer in quasi-prepolymer/filler mixture 24 to react and to foam, forming an unsolidified cohesive aggregate material 32. The reacting polymer begins to bond the filler material in a few seconds and begins to set in about one minute. This compares favorably to prior methods which included the formation of a slurry of polymer precursor and filler material. Therefore, aggregate material 32 must be deposited into a mold 34 quickly after contact with water occurs in order to form a molded aggregate 42.

Mold 34 may be an individual container, a "flat" or tray which contains a plurality of compartments, or a container of any other desired shape or configuration. Aggregate material 32 exits from mix head system 16 and is spread by a beater bar 35 (FIG. 2). Beater bar 35 is a rotating shaft containing pins which extend radially from the shaft. Beater bar 35 causes an initial dispersal of the aggregate material 32, thereby preventing accumulation of aggregate material 32 in portions of the mold directly below mix head system 16 at the expense of other portions of the mold. When aggregate material 32 is deposited into a tray-type mold, it is necessary to spread aggregate material 32 evenly across mold 34. Aggregate material 32 may be spread evenly across mold 34 by a roller 36. As shown in FIG. 2, a pair of oppositely oriented helical flights 38, 40 on the surface of roller 36 distribute aggregate material 32 evenly across and into mold 34 to form molded aggregate 42. It may be desirable for mold 34 to be placed on a motor driven conveyor 44 to facilitate the serial depositing of aggregate material 32 into a series of molds 34. Ideally, a controller is used to optimize control over the rate at which the pumps P and motors M operate within mixer 10 to assure proper mixing and movement of the components of molded aggregate 42.

Figure 4:
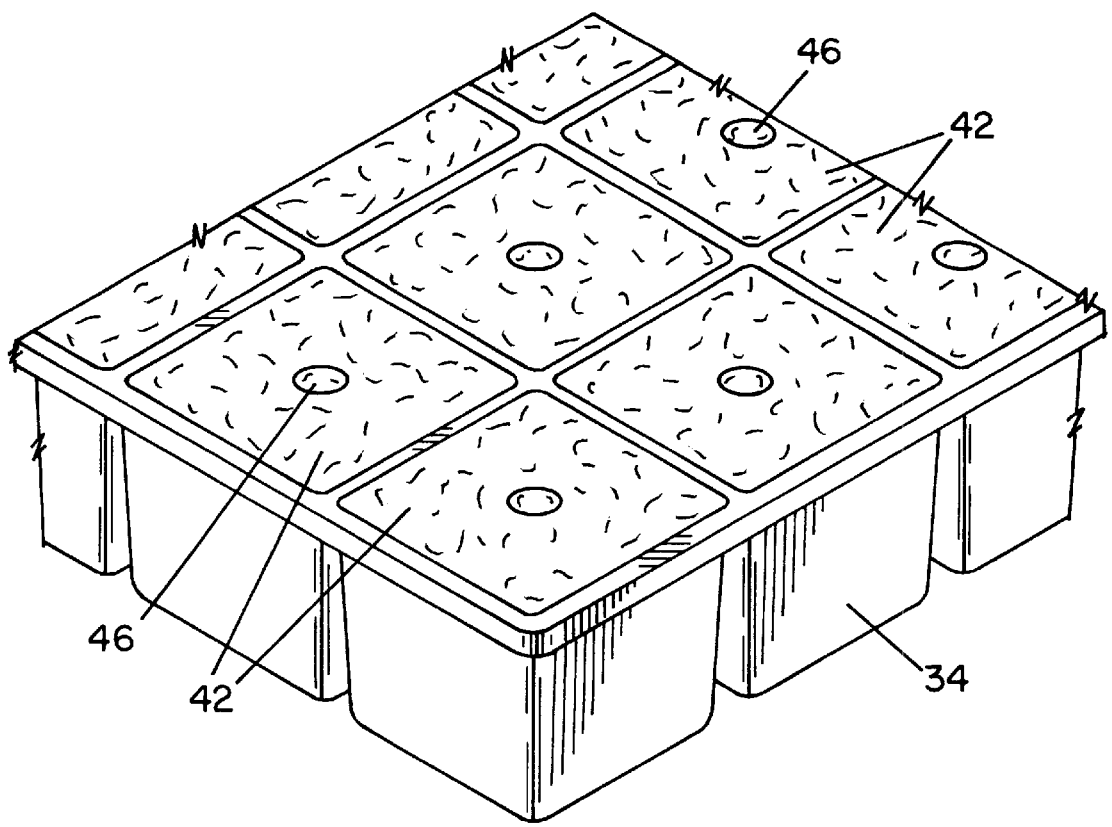
FIG. 4 is a schematic view of the horticultural growing medium of the present invention as deposited in a mold.

Conveyor 44 may also transport molded aggregate 42 to additional processing equipment (not shown). For example, as shown in FIG. 4, a cavity 46 may be introduced into molded aggregate 42. Cavity 46 may be introduced manually or by a dibble conveyor or other apparatus. Cavity 46 may be placed on the top of molded aggregate 42, as shown in FIG. 4, to promote ease of planting a seed or seedling in the aggregate. Cavity 46 may also be placed on the underside of molded aggregate 42 (not shown) to promote drainage of excess water during use, thereby decreasing or preventing damage to a growing plant from overwatering. It is also envisioned that molded aggregate 42 may be machined to take a predetermined shape and/or size. Molded aggregate 42 posses sufficient rigidity for it to be cut or otherwise divided or reduced in size or shaped.

The present invention also provides a method of growing plants comprising planting a seed or seedling in a horticultural growing medium containing a polyisocyanate-polyol-based polymer and at least one filler material as described hereinabove.

In order to demonstrate the practice of the current invention, the following examples are offered. These examples should be considered illustrative only and should not be viewed as limiting of the scope of the present invention.

Samples of the growing medium material were made according to the method of the present invention as described below. Raw materials were obtained from the suppliers shown in Table 1.

TABLE I

| Designation | Chemical Composition | NCO CONTENT (%) | Molecular Weight | Functionality | Equivalent Weight | Supplier |
| --- | --- | --- | --- | --- | --- | --- |
| PAPI 2094 | Polymethylene polyphenylene polyisocyanate | 32.0 | — | 2.3 | 131 | Dow |
| PAPI 2027 | Polymethylene polyphenylene polyisocyanate | 31.4 | — | 2.7 | 134 | Dow |
| Lupranate M-20S | Polymethylene polyphenylene polyisocyanate | 31.4 | — | 2.7 | 134 | BASF |

TABLE I-continued

| Designation | Chemical Composition | NCO CONTENT (%) | Molecular Weight | Functionality | Equivalent Weight | Supplier |
|---|---|---|---|---|---|---|
| Lupranate M-10 | Polymethylene polyphenylene polyisocyanate | 31.7 | — | 2.2 | 132 | BASF |
| Rubinate 1820 | Polymethylene polyphenylene polyisocyanate | 32.0 | — | 2.4 | 131 | Huntsman |
| Rubinate M | Polymethylene polyphenylene polyisocyanate | 31.5 | — | 2.7 | 133 | Huntsman |
| UCON 75-H-1400 | Random copolymer of ethylene oxide (75%) and propylene oxide (25%) | — | 2470 | 2.0 | 1235 | Union Carbide |
| UCON 50-HB-2000 | Random copolymer of ethylene oxide (50%) and propylene oxide (50%) | — | 2660 | 1.0 | 2660 | Union Carbide |
| UCON 50-HB-5100 | Random copolymer of ethylene oxide (50%) and propylene oxide (50%) | — | 3930 | 1.0 | 3930 | Union Carbide |
| Poly-G WT 1400 | Random copolymer of ethylene oxide (50%) and propylene oxide (50%) | — | 2500 | 2.0 | 1250 | BASF |
| Pluronic L35 | Block copolymer of propylene oxide (50%) and ethylene oxide (50%) | — | 1900 | 2.0 | 975 | BASF |

Quasi-prepolymers were synthesized from the above raw materials according to the amounts listed in Table II. Polyol was added to isocyanate and the resulting solution was mechanically mixed for 5–10 minutes in an open container without a nitrogen envelope and quasi-prepolymer was stored at approximately 24° C. The viscosity of the quasi-prepolymers was determined after 4 days of storage at 24° C. using a Brookfield Viscometer.

TABLE II

| No. | Isocyanate (g) | Polyol (g) | Viscosity (cps) |
|---|---|---|---|
| 1 | PAPI 2094 (298 g) | UCON 75H1400 (701 g) | 8,300 |
| 2 | PAPI 27 (302 g) | UCON 75H1400 (698 g) | 14,600 |
| 3 | Rubinate 1820 (299 g) | UCON 75H1400 (702 g) | 10,200 |
| 4 | Rubinate M (301 g) | UCON 75H1400 (698 g) | 15,000 |
| 5 | Lupranate-20S (302 g) | UCON 75H1400 (697 g) | 13,600 |
| 6 | PAPI 27 (301 g) | UCON 75H1400 (626 g) UCON 2000 (150 g) | 10,600 |
| 7 | PAPI 27 (309 g) | UCON 75H1400 (626 g) UCON 5100 (221 g) | 12,100 |

Foam composites were prepared from the above quasi-prepolymers by mixing the quasi-prepolymers with filler material as listed in Table III. The filler material was 16.4 parts by weight (pbw) dolomitic limestone, 16.4 pbw ground foam, 32.8 pbw sphagnum peat moss, 32.8 pbw coir and 1.64 pbw SOAX wetting agent from Smithers-Oasis. The quasi-prepolymer/filler mixture was then placed in a perforated container and slightly compacted. The perforated container was then placed in another container and a predetermined amount of preheated (about 40 to 45° C.) water was added. After the foam composite had set, the composites were cut in half and examined. The results of this examination are listed in Table III.

TABLE III

| | Composite: | | | | | | | | |
|---|---|---|---|---|---|---|---|---|---|
| | A | B | C | D | E | F | G | H | I |
| Quasi-Prepolymer (g) | | | | | | | | | |
| 1 | 25 | 25 | 15 | | | | | | |
| 2 | | | | | | 15 | | | |
| 3 | | | | 15 | | | | | |
| 4 | | | | | | | 15 | | |
| 5 | | | | | | | | 15 | |
| 6 | | | | | | | | | 15 |
| 7 | | | | | | | | | 15 |
| Filler (g) | 25 | 25 | 15 | 15 | 15 | 15 | 15 | 15 | 15 |
| Water (g) | 50 | 50 | 50 | 50 | 50 | 50 | 50 | 50 | 50 |
| Water Temperature (° C.) | 40 | 40 | 45 | 40 | 45 | 40 | 40 | 40 | 40 |

TABLE III-continued

|  | Composite: | | | | | | | | |
| --- | --- | --- | --- | --- | --- | --- | --- | --- | --- |
|  | A | B | C | D | E | F | G | H | I |
| Flexibility: | High | High | High | High | Low | Low | Low | Low | Low |
| Strength: | High | High | High | High | Low | Low | Low | Low | Low |

Quasi-prepolymers were also synthesized using the components listed in Table IV. Polyol was added to isocyanate and the resulting solution was mechanical mixed for 5–10 minutes in an open container without nitrogen and quasi-prepolymer was stored at approximately 25° C. The viscosity of the quasi-prepolymers was determined after 3 and 5 days of storage at 25° C. using a Brookfield Viscometer. The NCO percentage of the quasi-prepolymers was determined by di-n-butyl amine titration (ASTM D2572).

for 5–10 minutes in an open container without nitrogen and quasi-prepolymer was stored at approximately 25° C. The viscosity of the quasi-prepolymer was determined after 3 and 27 days of storage at 25° C. using a Brookfield Viscometer. The viscosity of the quasi-prepolymer after 3 days of storage was 11,000 centipoise (cps). After 27 days of storage, the viscosity was 25,250 cps. The theoretical NCO percentage of the quasi-prepolymer was 7.1 The actual NCO percentage of the quasi-prepolymers was determined by

TABLE IV

| No. | Isocyanate (g) | Polyol (g) | NCO:OH Equivalent weight ratio | Viscosity at 3 days (cps) | Viscosity at 5 days (cps) | Theoretical NCO % | Actual NCO % after 5 days |
| --- | --- | --- | --- | --- | --- | --- | --- |
| 8 | PAPI 2094 (251 g) | UCON 75H1400 (580 g) | 4:1 | 10,100 | 10,700 | 7.3 | 6.9 |
| 9 | PAPI 2094 (219 g) | UCON 75H1400 (688 g) | 3:1 | 17,300 | 23,250 | 5.1 | 4.9 |
| 10 | Lupranate M-10 (290 g) | UCON 75H1400 (678 g) | 4:1 | 12,100 | 12,160 | 7.1 | 6.9 |
| 11 | PAPI 2094 (300 g) | Pluronic L-35 (543 g) | 4:1 | 9,060 | 9,260 | 8.7 | 8.2 |
| 12 | PAPI 2094 (258 g) | UCON 75H1400 (496 g) UCON H-2000 (247 g) | 4:1 | 7,000 | 7,300 | 6.2 | 5.9 |
| 13 | PAPI 2094 (145 g) | UCON 75H1400 (370 g) UCON H-2000 (185 g) | 3:1 | 11,260 | 12,200 | 4.4 | 4.1 |

Foam composites were prepared from the quasi-prepolymer samples 8, and 10–12 by mixing the quasi-prepolymers with filler material as listed in Table V. The filler material was 16.4 parts by weight (pbw) dolomitic limestone, 16.4 pbw ground foam, 32.8 pbw sphagnum peat moss, 32.8 pbw coir and 1.64 pbw SOAX wetting agent from Smithers-Oasis. The composite mixture was then placed in a perforated container and slightly compacted. The perforated container was then placed in another container and a predetermined amount of preheated (about 45° C.) water was added. After the foam composite had set, the composites were cut in half and their properties were examined manually. The results of this examination are listed in Table V.

TABLE V

| Composite: | J | K | L | M |
| --- | --- | --- | --- | --- |
| Quasi-Prepolymer No. 8 (g) | 15 | | | |
| Quasi-Prepolymer No. 10 (g) | | | | 15 |
| Quasi-Prepolymer No. 11 (g) | | 15 | | |
| Quasi-Prepolymer No. 12 (g) | | | 15 | |
| Filler (g) | 15 | 15 | 15 | 15 |
| Water at ~47° C. (g) | 50 | 50 | 50 | 50 |
| Foam rise: | Good | Good | Good | Good |

A quasi-prepolymer was synthesized using 208 g of PAPI2094 and 493 g of Poly-G WT-1400. Mixing was done di-n-butyl amine titration (ASTM D2572) after 5 and 27 days of storage at 25° C. After 5 days of storage at 25° C., the NCO percentage was 6.5. After 27 days of storage at that temperature, the NCO percentage was 6.2.

The PAPI2094/Poly-G WT-1400 based quasi-prepolymer was used to make a foam composite by mixing 15 g quasi-prepolymer after 5 days of storage at 25° C. with 15 g of filler material. The filler material was 16.4 parts by weight (pbw) dolomitic limestone, 16.4 pbw ground foam, 32.8 pbw sphagnum peat moss, 32.8 pbw coir and 1.64 pbw SOAX wetting agent from Smithers-Oasis. The composite mixture was then placed in a perforated container and slightly compacted. The perforated container was then placed in another container and 50 g of preheated water (about 47° C.) was added. After the foam composite had set, the composite was cut in half and examined. The resulting composite did not exhibit good foam rise.

The above examples show that the quasi-prepolymer of the present invention is unexpectedly stable as evidenced by its NCO percentage after several days of storage, its relatively stable viscosity after storage and the activity of the quasi-prepolymer despite the lack of a nitrogen envelope when synthesizing the quasi-prepolymer. Based upon the foregoing disclosure, it should now be apparent that the composite growing medium and method of making the composite growing medium will carry out the one or more of the objectives set forth hereinabove. It is, therefore, to be understood that any variations evident fall within the scope of the claimed invention and thus, the selection of specific component elements can be determined without departing from the spirit of the invention herein disclosed and described.

We claim:

1. A horticultural growing medium consisting essentially of:
   a hydrophilic polyisocyanate-polyol-based polymer,
   at lease one filler material selected from the group consisting of earth, sand, pear moss, saw dust, manure, compost, limestone, coir, ground foam, and gypsum, and
   optionally, at least one component selected from the group consisting of wetting agents, trace elements, fertilizers, fungicides, herbicides, insecticides, and pigments,
   wherein said horticultural growing medium is a hydrophilic polyurethane-based growing medium capable of supporting plant growth.

2. The horticultural growing medium of claim 1, wherein said hydrophilic polyisocyanate-polyol-based polymer is the reaction product of polymethylene polyphenylene polyisocyanate having an average NCO functionality of about 2 to about 3, and a polyol.

3. The horticultural growing medium of claim 2, wherein said hydrophilic polyisocyanate-polyol-based polymer is the reaction product of diphenylmethane diisocyanate and a polyether glycol.

4. The horticultural growing medium of claim 3, wherein said polyether glycol is selected from the group consisting of random copolymers and block copolymers of propylene oxide and ethylene oxide.

5. The horticultural growing medium of claim 4, wherein said hydrophilic polyisocyanate-polyol-based polymer is a reaction product of a quasi-prepolymer having a NCO:OH equivalent weight ratio of about 3:1 to about 6:1, and water.

6. The horticultural growing medium of claim 1, wherein said at least one component selected from the group consisting of wetting agents, trace elements, fertilizers, fungicides, herbicides, insecticides, and pigments, is present.

7. A method of making a horticultural growing medium consisting essentially of the steps of;
   mixing at least one filler material selected from the group consisting of earth, sand, peat moss, saw dust, manure, compost, limestone, coir, ground foam, and gypsum, with a polyisocyanate-polyol-based quasi-prepolymer, to form a quasi-prepolymer/filler mixture;
   applying water to said quasi-prepolymer/filler mixture to form a hydrophilic polyurethane-based growing medium capable of supporting plant growth,
   and optionally, immediately depositing said hydrophilic polyurethane-based growing medium in a mold and allowing it to solidify in the mold, forming a molded growing medium,
   and optionally, additionally performing at least one of the following processing steps: (a) introducing a cavity into said molded growing medium; (b) altering the shape of said molded growing medium, and/or (c) altering the size of said molded growing medium.

8. The method of claim 7, wherein said optional step of immediately depositing said hydrophilic polyurethane-based growing medium in a mold and allowing it to solidify in the mold, forming a molded growing medium, is performed.

9. The method of claim 8, wherein said water is applied to said quasi-prepolymer/filler mixture by spraying as the quasi-prepolymer/filler mixture is being deposited into the mold.

10. The method of claim 8, wherein said step of optionally, additionally performing at least one of the following processing steps: (a) introducing a cavity into said molded growing medium; (b) altering the shape of said molded growing medium, and/or (c) altering the size of said molded growing medium, is performed.

11. The method of claim 7, wherein said polyisocyanate-polyol-based quasi-prepolymer comprises polymethylene polyphenylene polyisocyanate having an average NCQ functionality of about 2 to about 3, and a polyol.

12. The method of claim 11, wherein said polyisocyanate-polyol-based quasi-prepolymer comprises diphenylmethane diisocyanate and a polyether glycol.

13. The method of claim 12, wherein said polyether glycol is selected from the group consisting of random copolymers and block copolymers of propylene oxide and ethylene oxide.

14. The method of claim 7, wherein the NCO:OH equivalent weight ratio of the polyisocyanate-polyol-based quasi-prepolymer is between about 3:1 and about 6:1.

15. The method of claim 14, wherein said NCO:OH equivalent weight ratio is about 4:1.

16. A method of growing plant seedlings comprising:
   planting a seed or seedling in a horticultural growing medium consisting essentially of a hydrophilic polyisocyanate-polyol-based polymer and at least one filler material selected from the group consisting of earth, sand, peat moss, saw dust, manure, compost, limestone, coir, ground foam, and gypsum, and optionally additionally containing at least one component selected from The group consisting of wetting agents, blowing agents, trace elements, fertilizers, fungicides herbicides, insecticides, and pigments.

17. The method of claim 16, wherein said polyisocyanate-polyol-based polymer is the reaction product of polymethylene polyphenylene polyisocyanate having an average NCO functionality of about 2 to about 3, and a polyol.

18. The method of claim 17, wherein said polyisocyanate-polyol-based polymer is the reaction product of diphenylmethane diisocyanate and a polyether glycol.

19. The method of claim 18, wherein the polyether glycol is selected from the group consisting of random copolymers and block copolymers of propylene oxide and ethylene oxide.

20. The method of claim 19, wherein said polyisocyanate-polyol-based polymer is the reaction product of a quasi-prepolymer having a NCO:OH equivalent weight ratio of between about 3:1 and about 6:1.

21. The method of claim 20, wherein said NCO:OH equivalent weight ratio is about 4:1.

22. The method of claim 16, wherein said optional at least one component selected from the group consisting of wetting agents, blowing agents, trace elements, fertilizers, fungicides herbicides, insecticides, and pigments is present.

23. A hydrophilic urethane polymer consisting essentially of the reaction product of a quasi-prepolymer and water wherein the quasi-prepolymer contains an isocyanate and a hydrophilic polyol.

24. A method of making a hydrophilic polyurethane consisting essentially of the steps of;
   adding a hydrophilic polyol to an isocyanate;
   mixing the polyol and isocyanate to form a quasi-prepolymer; and
   contacting the quasi-prepolymer with water to create a hydrophilic polyurethane.

* * * * *